United States Patent
Li et al.

(10) Patent No.: US 9,930,524 B2
(45) Date of Patent: Mar. 27, 2018

(54) DETECTING A SECOND USER DEVICE IDENTIFIER BASED ON REGISTRATION OF A FIRST USER DEVICE IDENTIFIER

(71) Applicant: Verizon Patent and Licensing Inc., Arlington, VA (US)

(72) Inventors: Mingxing S. Li, San Jose, CA (US); Ce Xu, San Ramon, CA (US); Priscilla Lau, Fremont, CA (US); Xuming Chen, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/745,705

(22) Filed: Jun. 22, 2015

(65) Prior Publication Data
US 2016/0374044 A1 Dec. 22, 2016

(51) Int. Cl.
*H04M 3/42* (2006.01)
*H04W 12/06* (2009.01)
*H04L 29/08* (2006.01)
*H04M 11/04* (2006.01)
*H04W 60/00* (2009.01)
*H04W 4/22* (2009.01)

(52) U.S. Cl.
CPC ............ *H04W 12/06* (2013.01); *H04L 67/04* (2013.01); *H04L 67/22* (2013.01); *H04L 67/2833* (2013.01); *H04L 67/306* (2013.01); *H04M 11/04* (2013.01); *H04W 4/22* (2013.01); *H04W 60/00* (2013.01)

(58) Field of Classification Search
CPC ........ H04W 4/22; H04W 60/00; H04M 11/04
USPC .................................. 455/411, 414.1, 435.1
See application file for complete search history.

(56) References Cited

U.S. PATENT DOCUMENTS

| | | | |
|---|---|---|---|
| 6,449,474 B1 * | 9/2002 | Mukherjee | H04M 3/2281 379/201.01 |
| 8,249,592 B1 * | 8/2012 | Nielsen | H04L 63/0884 370/310.2 |
| 2004/0180657 A1 * | 9/2004 | Yaqub | H04L 63/0853 455/435.1 |

(Continued)

OTHER PUBLICATIONS

Garcia-Martin et al., "Diameter Session Initiation Protocol (SIP) Application," https://tools.ietf.org/html/rfc4740, Nov. 2006, 72 pages.

*Primary Examiner* — Charles Appiah
*Assistant Examiner* — Jaime Holliday

(57) ABSTRACT

A system may receive a registration request that identifies a first user device identifier. The system may determine that the first user device identifier is not registered. The system may transmit an authentication challenge. The authentication challenge may request one or more credentials associated with a subscriber profile. The first user device identifier may be associated with the subscriber profile. The system may cause the first user device identifier to be registered based on a challenge response. The first user device identifier may be registered based on a result of authenticating the registration request. The system may receive subscriber information that is associated with the first user device identifier, based on causing the first user device identifier to be registered. The system may determine that the subscriber information identifies a second user device that may be associated with the subscriber profile. The system may provide a notification.

20 Claims, 13 Drawing Sheets

(56) References Cited

U.S. PATENT DOCUMENTS

| | | | |
|---|---|---|---|
| 2007/0105531 A1* | 5/2007 | Schroeder, Jr. ... | H04M 3/42008 455/411 |
| 2009/0093232 A1* | 4/2009 | Gupta .................. | H04L 63/104 455/410 |
| 2010/0246441 A1* | 9/2010 | Jung ....................... | H04L 63/00 370/254 |

* cited by examiner

DETECTING A SECOND USER DEVICE IDENTIFIER BASED ON REGISTRATION OF A FIRST USER DEVICE IDENTIFIER

BACKGROUND

A user device may be associated with a user device identifier, such as a phone number, an email address, a network address, or the like. Some user devices may be associated with two or more user device identifiers, and such user devices may permit a user to access a network service in relation to the two or more user device identifiers. For example, a user device may select a particular user device identifier, of the two or more user device identifiers, for accessing a particular network service.

DETAILED DESCRIPTION OF PREFERRED EMBODIMENTS

The following detailed description of example implementations refers to the accompanying drawings. The same reference numbers in different drawings may identify the same or similar elements.

A user device may be associated with two or more user device identifiers, such as phone numbers, Mobile Device Numbers (MDNs), email addresses, Internet Protocol (IP) Multimedia Public Identities (IMPUs), or the like. The user device may register with a network (e.g., an IP Multimedia Subsystem (IMS) core of an LTE network) to access a network service (e.g., a video call service, a Voice over IP (VoIP) service, etc.) based on a first user device identifier of the two or more user device identifiers. A network device may monitor activity associated with a user device identifier. For example, a second user device identifier, of the two or more user device identifiers, may be flagged for suspicious activity, and the network device may accordingly monitor activity associated with the second user device identifier. However, when registering the user device based on the first user device identifier, the network device may not be capable of determining that the user device is also associated with the second user device identifier. Implementations described herein may permit the network device to determine that the user device, which may be registered based on the first user device identifier, is associated with the second user device identifier based on messages and/or information transmitted during the registration process.

Figure 1:
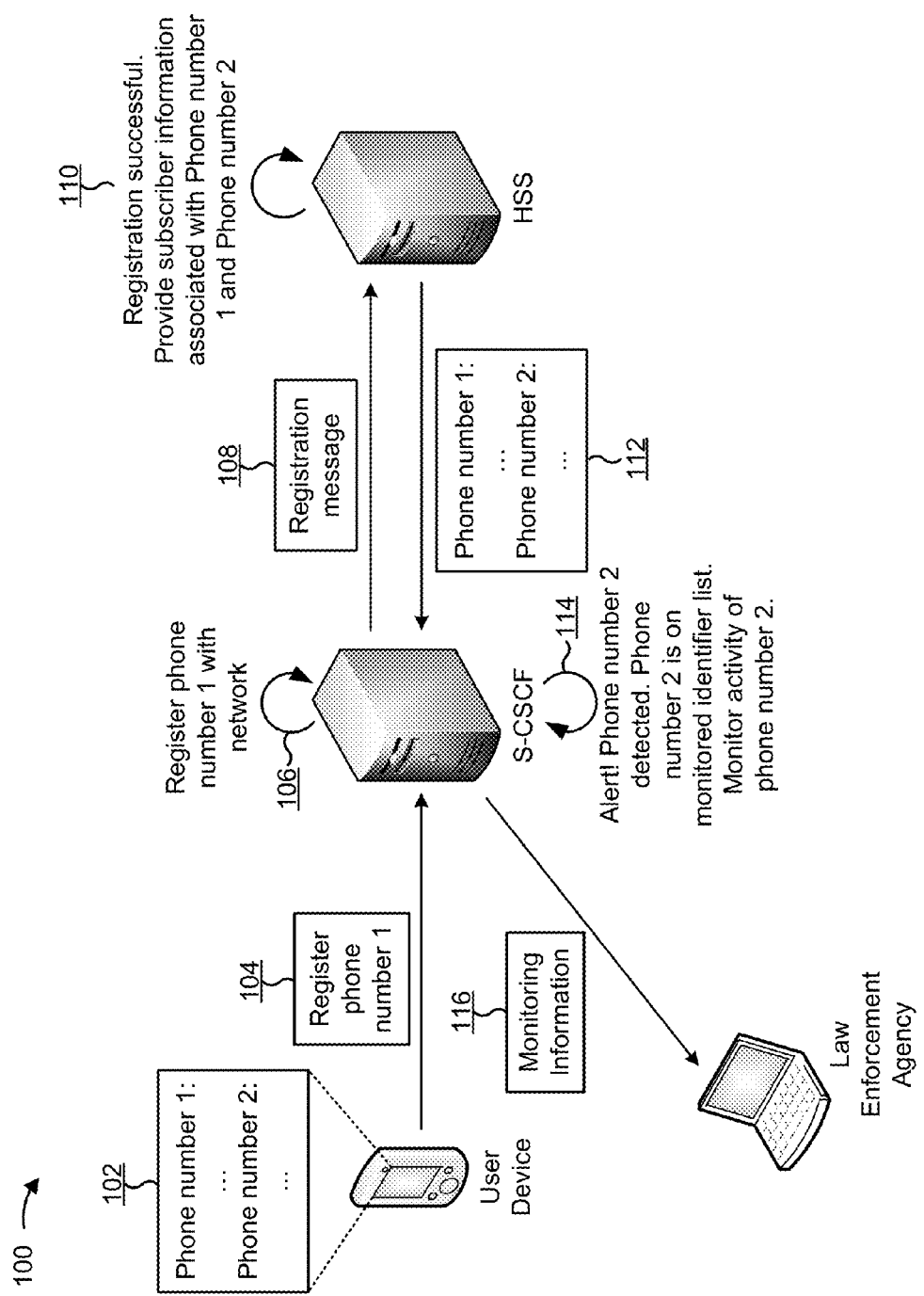
FIG. 1 is a diagrams of an overview of an example implementation described herein.

FIG. 1 is a diagram of an overview of an example implementation 100 described herein. For the purpose of FIG. 1, and as shown by reference number 102, assume that a single user device is associated with two user device identifiers, shown as "phone number 1" and "phone number 2." Assume further that a serving call session control function device (S-CSCF) stores a monitored identifier list that identifies the second user device identifier (i.e., phone number 2) as a monitored user device identifier. The monitored identifier list may identify a plurality of user device identifiers that are subject to monitoring by a network device, such as the S-CSCF, and may be provided to the S-CSCF by a law enforcement agency, a network administrator, a mediation device, or the like.

As shown in FIG. 1, and by reference number 104, the user device may provide, to the S-CSCF, a registration request that requests to register phone number 1. As shown by reference number 106, the S-CSCF may register phone number 1 with the network, and may provide a registration message to a home subscriber server based on registering phone number 1, as shown by reference number 108. As shown by reference number 110, based on the registration and the registration message, the home subscriber server may provide subscriber information, associated with phone number 1, to the S-CSCF. As shown by reference number 112, the subscriber information may indicate that the user device is associated with phone number 1 and phone number 2.

As shown by reference number 114, the S-CSCF may receive the subscriber information, and may detect that the subscriber information identifies phone number 2. As further shown, the S-CSCF may determine that phone number 2 is identified by the monitored identifier list, and may accordingly monitor activity related to the second phone number. As shown by reference number 116, the S-CSCF may provide monitoring information, for example, to a device associated with a law enforcement agency.

In this way, the S-CSCF may determine a second user device identifier based on a request to register a first user device identifier. In some implementations, the S-CSCF may determine the second user device identifier based on information transmitted and/or received during the registration process (e.g., without generating and/or transmitting an additional request for the second user device identifier), which may conserve resources (e.g., processing power) of the S-CSCF and/or reduce network congestion.

Figure 2:
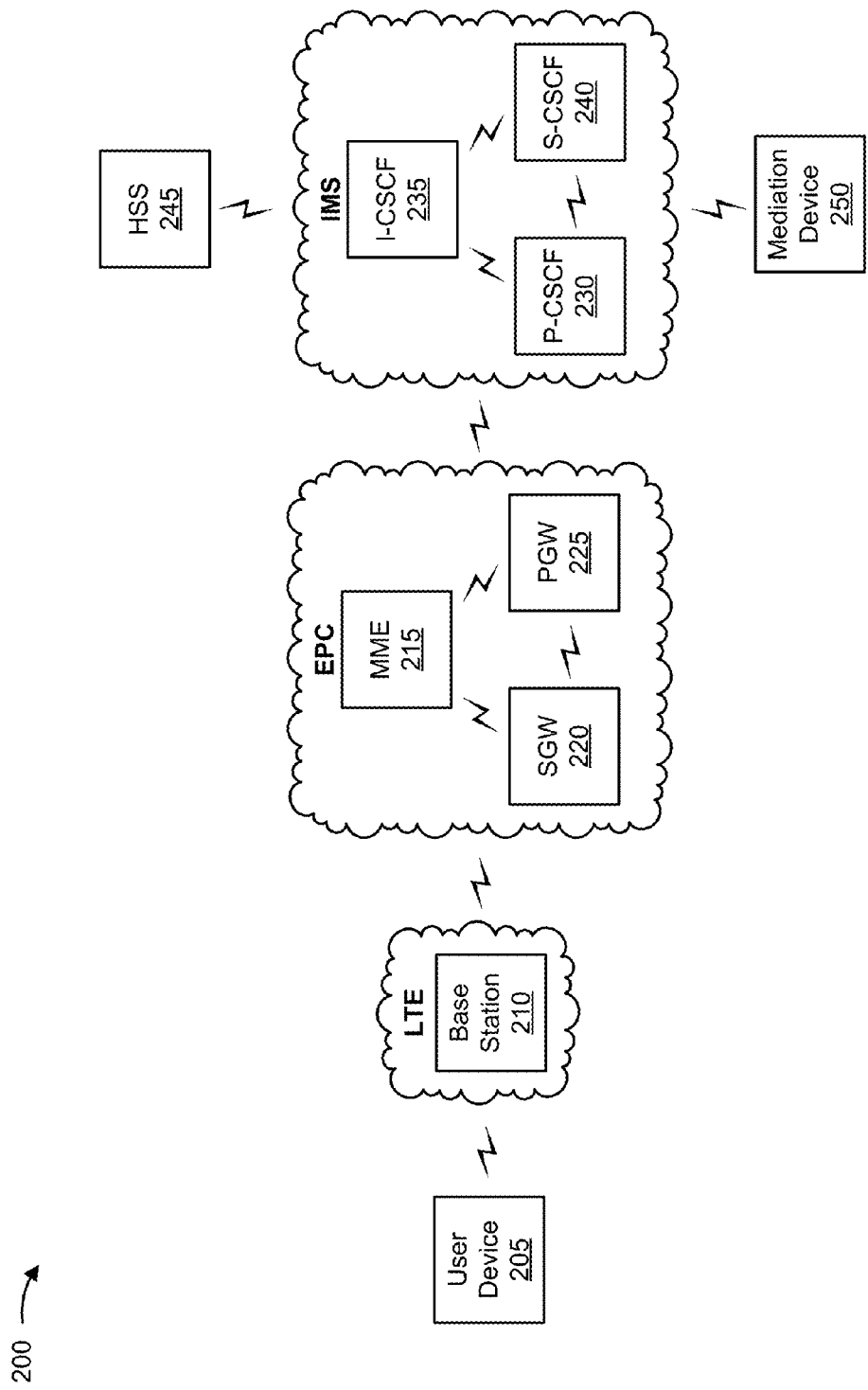
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a base station 210, a mobility management entity (MME) 215, a serving gateway (SGW) 220, a packet data network gateway (PGW) 225, a proxy call session control function device (P-CSCF) 230, an interrogating call session control function device (I-CSCF) 235, a serving call session control function device (S-CSCF) 240, a home subscriber server (HSS) 245, and a mediation device 250.

Environment 200 may include an evolved packet system (EPS) that includes a long-term evolution (LTE) network and/or an evolved packet core (EPC) that operate based on a third generation partnership project (3GPP) wireless communication standard. The LTE network may be a radio access network (RAN) that includes one or more base stations 210 that take the form of evolved Node Bs (eNBs) via which user device 205 communicates with the EPC. The EPC may include MME 215, SGW 220, and PGW 225 that enable user device 205 to communicate with an Internet protocol (IP) multimedia subsystem (IMS) network. The IMS network may include P-CSCF 230, I-CSCF 235, and/or S-CSCF 240, and may manage authentication, session initiation, and/or a call routing function for IMS services. HSS 245 may provide authentication information, subscriber profile information, quality of service rules, registration status information, serving node information, etc., associated with IMS services provided to from user device 205. In some implementations, HSS 245 may reside in the EPC and/or the IMS network.

User device 205 may include one or more devices that are capable of communicating with one or more devices of environment 200. For example, user device 205 may include a wireless communication device, a radiotelephone, a personal communications system ("PCS") terminal (e.g., that may combine a cellular radiotelephone with data processing and data communications capabilities), a smart phone, a laptop computer, a tablet computer, a personal gaming system, and/or a similar device. In some implementations, user device 205 may be associated with multiple user device identifiers (e.g., multiple IP Multimedia Public Identities (IMPUs), uniform resource identifiers (URIs), mobile device numbers (MDNs), international mobile station equipment identities (IMEIs), international mobile subscriber profile identities (IMSIs), email addresses, etc.).

Base station 210 may include a device capable of transferring traffic, such as IMS traffic, audio traffic, video traffic, text traffic, and/or other traffic, destined for and/or received from user device 205. In some implementations, base station 210 may be include an eNB associated with the LTE network that receives traffic from and/or sends traffic to the IMS network via MME 215, SGW 220, and/or PGW 225. In some implementations, base station 210 may send traffic to and/or receive traffic from user device 205 via an air interface. In some implementations, base station 210 may be associated with a small cell, such as a microcell, a picocell, and/or a femtocell.

MME 215 may include a device capable of managing authentication, activation, deactivation, and mobility functions associated with user device. For example, MME 215 may include a server. In some implementations, MME 215 may perform operations relating to authentication of user device 205. Additionally, or alternatively, MME 215 may facilitate the selection of a SGW 220 and/or PGW 225 to serve traffic to and/or from user device 205. MME 215 may perform an operation associated with handing off user device 205 from a first base station 210 to a second base station 210 when user device 205 is transitioning from a cell associated with the first base station 210 to a cell associated with the second base station 210. Additionally, or alternatively, MME 215 may select another MME (not pictured), to which user device 205 should be handed off (e.g., when user device 205 moves out of range of MME 215).

SGW 220 may include a device capable of routing traffic. For example, SGW 220 may include one or more data processing and/or traffic transfer devices, such as a gateway, a router, a modem, a switch, a firewall, a network interface card ("NIC"), a hub, a bridge, a server, an optical add/drop multiplexer ("OADM"), or any other type of device that processes and/or transfers traffic. In some implementations, SGW 220 may aggregate traffic received from one or more base stations 210 associated with the LTE network, and may send the aggregated traffic to PGW 225 and/or other network devices associated with the IMS core and/or the EPC. In some implementations, SGW 220 may perform operations associated with handing off user device 205 to and/or from the LTE network.

PGW 225 may include a device capable of providing connectivity for user device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server, an OADM, or any other type of device that processes and/or transfers traffic. In some implementations, PGW 225 may aggregate traffic received from one or more SGWs 220, and may send the aggregated traffic to another device and/or network.

P-CSCF 230, I-CSCF 235, and S-CSCF 240 may include one or more devices, such as one or more server devices included in an IMS network, capable of managing signal and control functions in the IMS network. In some implementations, P-CSCF 230, I-CSCF 235, and/or S-CSCF 240 may process and/or route service information, associated with an IMS service, to and from user device 205. In some implementations, P-CSCF 230, I-CSCF 235, and/or S-CSCF 240 may be capable of receiving, determining, storing, generating, and/or providing information that causes user device 205 to register to the IMS network. In some implementations, P-CSCF 230, I-CSCF 235, and/or S-CSCF 240 may communicate with HSS 245 to determine information (e.g., authentication information, location information, etc.) associated with user device 205. In some implementations, P-CSCF 230, I-CSCF 235, and/or S-CSCF 240 may receive, store, and/or process a monitored identifier list and/or may determine whether one or more user device identifiers, associated with user device 205, are identified by the monitored identifier list.

HSS 245 may include one or more devices, such as one or more server devices, capable of managing subscription and/or other information associated with user device 205. For example, HSS 245 may receive, store, and/or provide profile information associated with user device 205 that identifies IMS applications and/or IMS services that are permitted for use by and/or accessible by user device 205, information associated with users of user device 205 (e.g., a username, a password, a personal identification number ("PIN"), one or more user device identifiers, etc.), subscription information, rate information, minutes allowed, bandwidth allocation policy information, and/or other information. In some implementations, HSS 245 may store information identifying a particular S-CSCF 240 that is associated with a particular user device identifier that is registered with the IMS network.

Mediation device 250 may include one or more devices capable of receiving, storing, processing, and/or providing information. For example, mediation device 250 may include a server device or a group of server devices. Mediation device 250 may receive information identifying one or more user device identifiers from another device (e.g., a device associated with a law enforcement agency, a network administrator, a government entity, etc.). Mediation device 250 may store, process, and/or provide the information identifying the one or more user device identifiers (e.g., as a monitored identifier list, to one or more S-CSCFs 240). In some implementations, mediation device 250 may receive and/or process monitoring information related to a user device identifier identified by a monitored identifier list, and may provide the monitoring information to another device (e.g., a device associated with a law enforcement agency, a network administrator, a government entity, etc.).

While implementations described herein are described as being performed by devices associated with an LTE network, some implementations may be performed by devices associated with a network that is not an LTE network, such as a third generation ("3G") network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
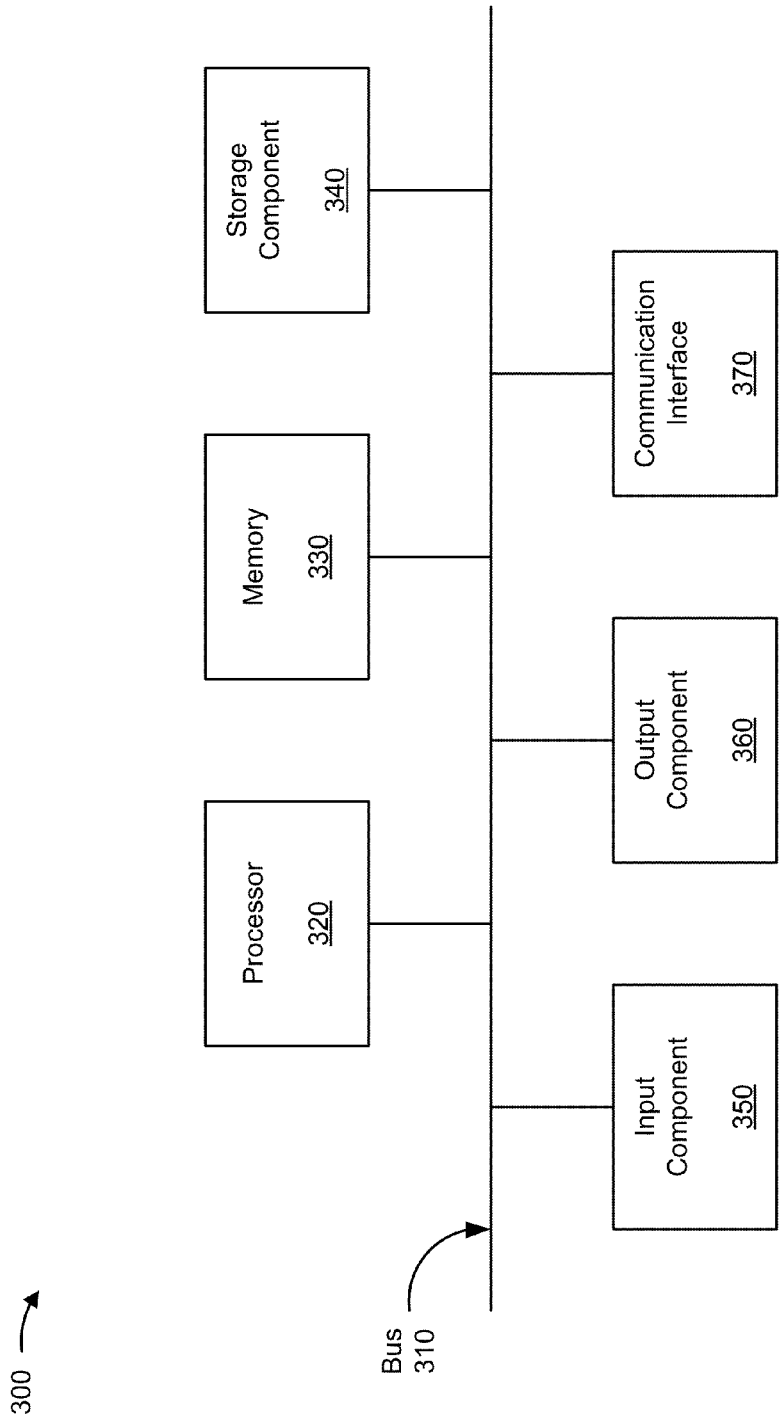
FIG. 3 is a diagram of example components of one or more devices of FIG. 2.

FIG. 3 is a diagram of example components of a device 300. Device 300 may correspond to user device 205, base station 210, MME 215, SGW 220, PGW 225, P-CSCF 230, I-CSCF 235, S-CSCF 240, HSS 245, and/or mediation device 250. In some implementations, user device 205, base station 210, MME 215, SGW 220, PGW 225, P-CSCF 230, I-CSCF 235, S-CSCF 240, HSS 245, and/or mediation device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read-only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
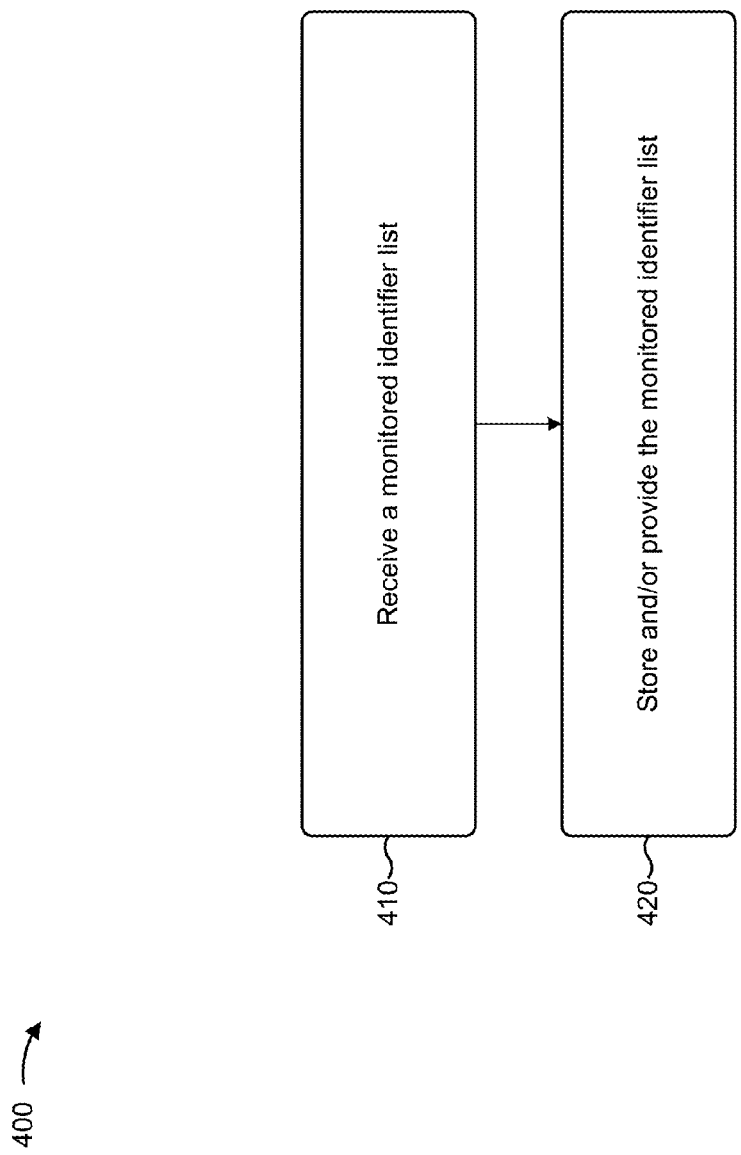
FIG. 4 is a flow chart of an example process for receiving and/or storing a monitored identifier list.

FIG. 4 is a flow chart of an example process 400 for receiving and/or storing a monitored identifier list. In some implementations, one or more process blocks of FIG. 4 may be performed by S-CSCF 240. In some implementations, one or more process blocks of FIG. 4 may be performed by another device or a group or devices separate from or including S-CSCF 240, such as user device 205, base station 210, MME 215, SGW 220, PGW 225, P-CSCF 230, I-CSCF 235, HSS 245, and/or mediation device 250.

As shown in FIG. 4, process 400 may include receiving a monitored identifier list that identifies user device identifiers to monitor (block 410). For example, S-CSCF 240 may receive a monitored identifier list. The monitored identifier list may identify one or more user device identifiers. S-CSCF 240 or another device (e.g., MME 215, SGW 220, PGW 225, etc.) may monitor activity of user devices 205 that are associated with a user device identifier identified by the monitored identifier list.

In some implementations, S-CSCF 240 may receive the monitored identifier list from mediation device 250. Mediation device 250 may, in some implementations, generate the monitored identifier list based on receiving one or more user device identifiers from another device (e.g., a device associated with a law enforcement agency, a network administrator, a government entity, etc.). Additionally, or alternatively, mediation device 250 may receive the monitored identifier list from the other device, and may provide the monitored identifier list to S-CSCF 240.

In some implementations, multiple S-CSCFs 240 may receive the monitored identifier list. For example, multiple S-CSCFs 240 may be associated with the LTE network, and one or more S-CSCFs 240, of the multiple S-CSCFs 240, may receive the monitored identifier list. Each S-CSCF 240, of the multiple S-CSCFs 240, may perform functions for different user devices 205, and may determine whether user device identifiers, associated with the different user devices 205 and/or users of the different user devices 205, are identified by the monitored identifier list.

In some implementations, S-CSCF 240 may receive an updated monitored identifier list. For example, S-CSCF 240 may receive additional user device identifiers to include in the monitored identifier list, and/or may receive an instruction to remove one or more user device identifiers from the monitored identifier list. Additionally, or alternatively, S-CSCF 240 may receive a second monitored identifier list to replace a first monitored identifier list stored by S-CSCF 240.

As further shown in FIG. 4, process 400 may include storing and/or providing the monitored identifier list (block 420). For example, S-CSCF 240 may store the monitored identifier list received from mediation device 250. Additionally, or alternatively, S-CSCF 240 may provide the monitored identifier list (e.g., to another S-CSCF 240, etc.). In some implementations, S-CSCF 240 may receive multiple user device identifiers, may generate a monitored identifier list that identifies the multiple user device identifiers, and may store and/or provide the generated monitor identifier list. In this way, S-CSCF 240 may facilitate monitoring of user devices 205 that are associated with user device identifiers that are identified by the monitored identifier list.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
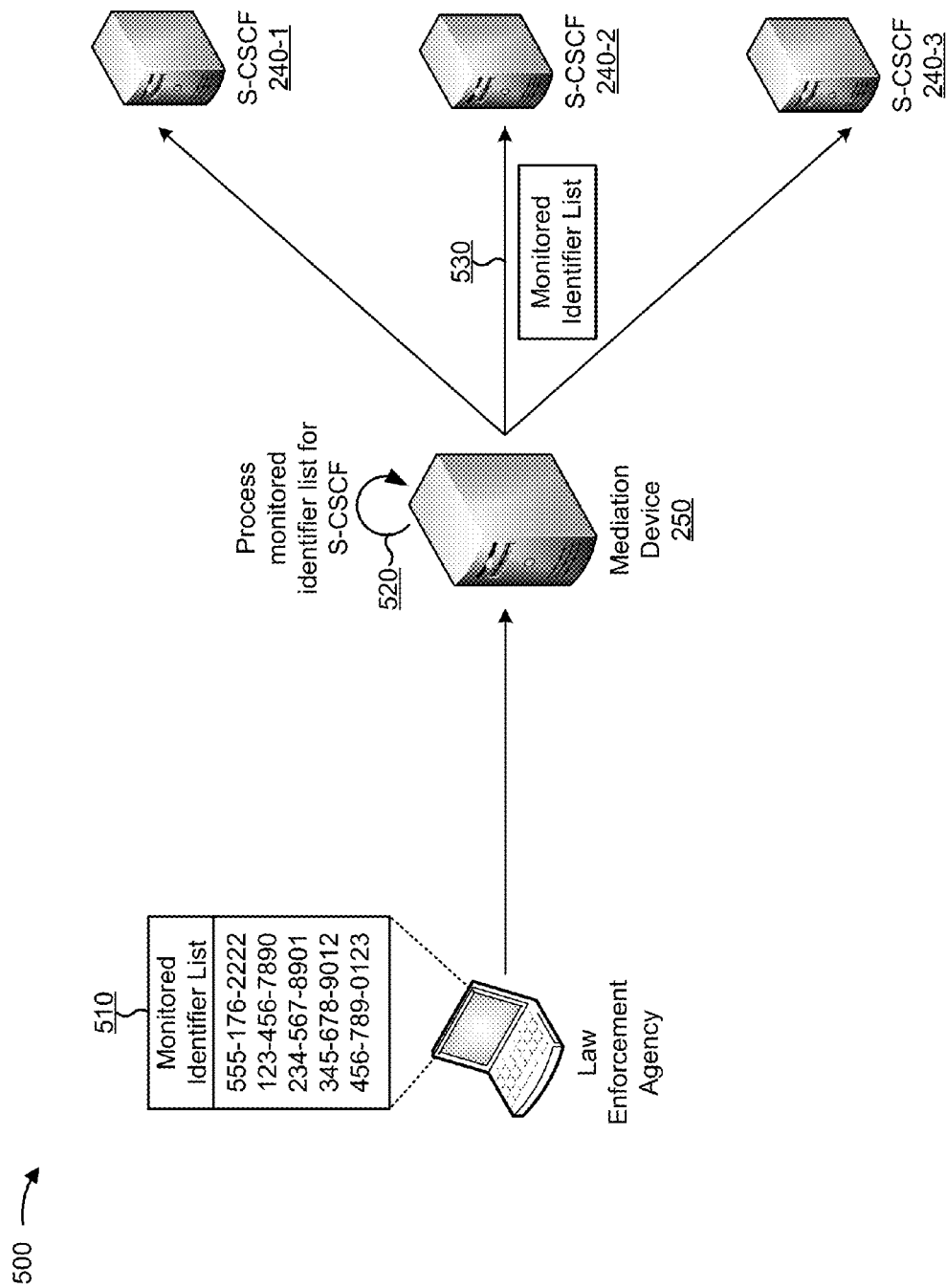
FIG. 5 is a diagram of an example implementation relating to the example process shown in FIG. 4.

FIG. 5 is a diagram of an example implementation 500 relating to example process 400 shown in FIG. 4. FIG. 5 shows an example of receiving and/or storing a monitored identifier list.

As shown in FIG. 5, and by reference number 510, mediation device 250 may receive, from a device associated with a law enforcement agency, a monitored identifier list. As shown, the monitored identifier list may identify multiple user device identifiers (e.g., 555-176-2222, 123-456-7890, 234-567-8901, 345-678-9012, and 456-789-0123). A user device identifier, of the multiple user device identifiers, may be subject to monitoring when registered with the IMS network, based on being identified by the monitored identifier list.

As shown by reference number 520, mediation device 250 may process the monitored identifier list for providing to S-CSCF 240, and may provide the monitored identifier list to a group of S-CSCFs 240-1 through 240-3, as shown by reference number 530. Assume that each S-CSCF 240, of the group of S-CSCFs 240, is associated with a different type of user device 205. For example, S-CSCF 240-1 may be associated with user devices 205 that are associated with a first network service, S-CSCF 240-2 may be associated with user devices 205 that are associated with a second network service, and S-CSCF 240-3 may be associated with user devices 205 that are not associated with either the first network service or the second network service. Assume that the group of S-CSCFs 240 store the monitored identifier list.

As indicated above, FIG. 5 is provided merely as an example. Other examples are possible and may differ from what was described with regard to FIG. 5.

Figure 6:
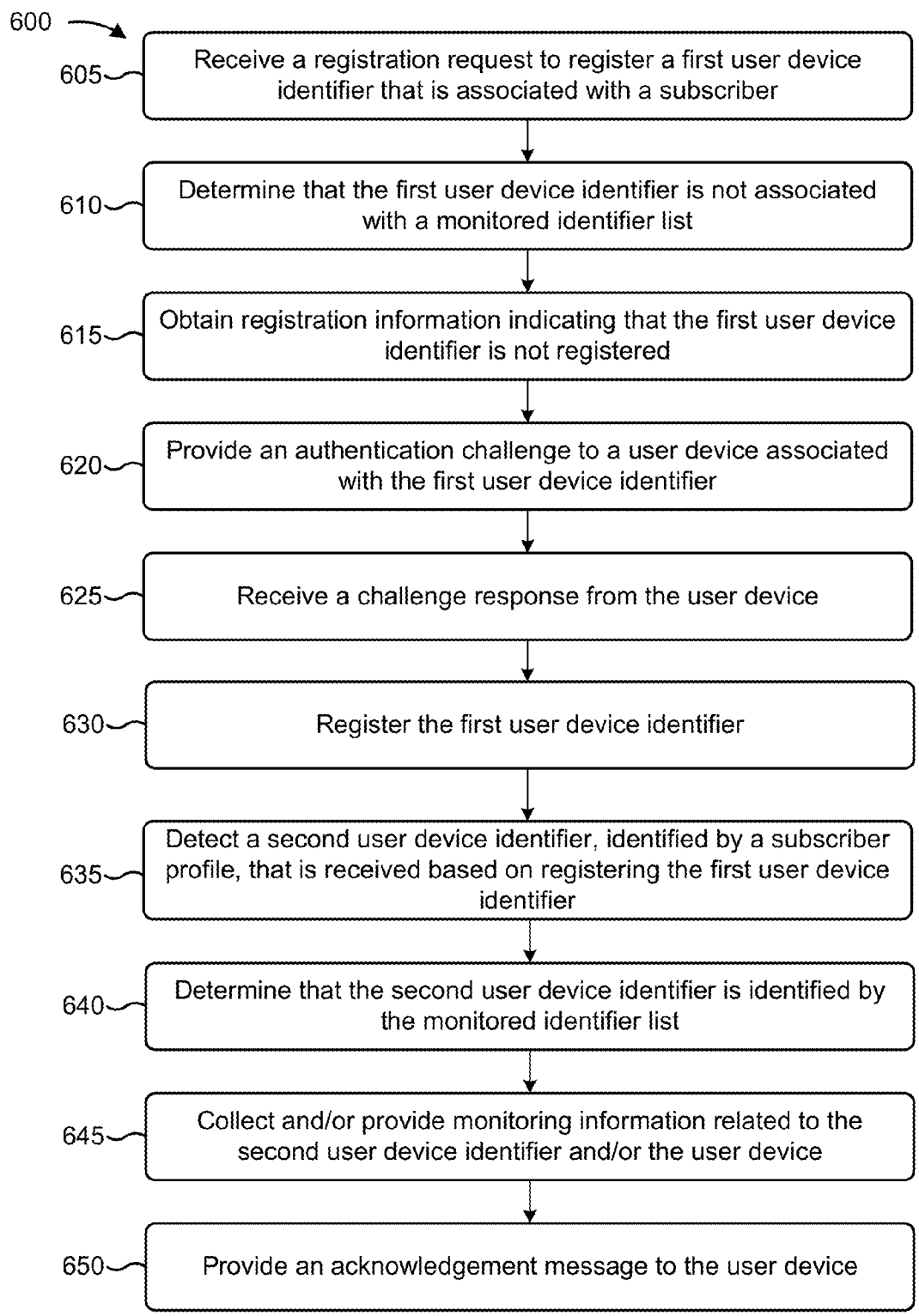
FIG. 6 is a flow chart of an example process for detecting a second user device identifier based on registering a first user device identifier.

FIG. 6 is a flow chart of an example process 600 for detecting a second user device identifier based on registering a first user device identifier. In some implementations, one or more process blocks of FIG. 6 may be performed by S-CSCF 240. In some implementations, one or more process blocks of FIG. 4 may be performed by another device or a group or devices separate from or including S-CSCF 240, such as user device 205, base station 210, MME 215, SGW 220, PGW 225, P-CSCF 230, I-CSCF 235, HSS 245, and/or mediation device 250.

As shown in FIG. 6, process 600 may include receiving a registration request to register a first user device identifier that is associated with a subscriber profile (block 605). For example, S-CSCF 240 may receive a registration request, from user device 205, that identifies a first user device identifier. The registration request may request to register user device 205 and/or the first user device identifier with the IP multimedia subsystem (IMS) network. The first user device identifier may be associated with a subscriber profile, and the subscriber profile may be associated with a second user device identifier. In some implementations, the first user device identifier and the second user device identifier may be associated with user device 205 and/or the subscriber profile.

In some implementations, HSS 245 may store a subscriber profile associated with the first user device identifier. The subscriber profile may identify characteristics of user device 205 (e.g., for use by I-CSCF 235 to select a particular S-CSCF 240 to register user device 205), one or more user device identifiers associated with the subscriber profile and/or user device 205, a registration status of one or more of the user device identifiers, one or more credentials for registering and/or authenticating one or more of the user device identifiers with an IMS network, or the like.

One or more of the user device identifiers, associated with the subscriber profile, may be identified by a monitored identifier list, which may indicate that S-CSCF 240 or another device is to collect monitoring information related to the subscriber profile, related to user device 205, and/or related to user device identifiers identified by the monitored identifier list. S-CSCF 240 may determine a second user device identifier, identified by the monitored identifier list, based on receiving the registration request associated with the first user device identifier, as described in more detail below.

The registration request may request that S-CSCF 240 perform registration of the first user device identifier with the IMS network, and may identify the first user device identifier (e.g., an IP Multimedia Public Identity (IMPU), a mobile device number (MDN), an email address, etc.) and a network address associated with user device 205 (e.g., an email address, an IP address, a telephone number, etc.). S-CSCF 240 may communicate with user device 205 based on the network address, in some implementations.

In some implementations, the registration request may request registration of the first user device identifier, and S-CSCF 240 may register the first user device identifier and the second user device identifier based on the registration request. For example, S-CSCF 240 may be configured to register each user device identifier, associated with the subscriber profile, based on receiving a registration request related to one of the user device identifiers associated with the subscriber profile. Based on implementations described herein, S-CSCF 240 may identify each user device identifier associated with the subscriber profile, and may perform one or more actions based on identifying each user device identifier.

In some implementations, S-CSCF 240 may receive the registration request via another device. For example, user device 205 may provide the registration request to P-CSCF 230, which may provide the registration request to I-CSCF 235. In some implementations, S-CSCF 240 may receive the registration request from I-CSCF 235 based on information obtained by I-CSCF 235 from another device. For example, I-CSCF 235 may determine a particular S-CSCF 240 to which to provide the registration request, based on user device information stored by HSS 245 and/or associated with the subscriber profile. The user device information may identify a type of user device 205, characteristics of user device 205, or the like, based on which I-CSCF 235 may select a particular S-CSCF 240 to which to provide the registration request.

As further shown in FIG. 6, process 600 may include determining that the first user device identifier is not associated with a monitored identifier list (block 610). For example, S-CSCF 240 may store a monitored identifier list that identifies one or user device identifiers to monitor. S-CSCF 240 may check the first user device identifier against the monitored user device identifier list, and may determine that the first user device identifier is not identified by the monitored identifier list. Based on determining that the first user device identifier is not identified by the monitored identifier list, S-CSCF 240 may not monitor activity of user device 205 and/or the first user device identifier.

In some implementations, S-CSCF 240 may determine that the first user device identifier is identified by the monitored identifier list. In that case, S-CSCF 240 may monitor activity of the first user device identifier and/or user device 205. For example, S-CSCF 240 may collect monitoring information related to communications sent from and/or received by user device 205, call information, lengths of calls, location information, information stored and/or accessed by and/or via user device 205, webpages accessed by user device 205, network service access and/or usage by user device 205 based on the first user device identifier and/or the second user device identifier (e.g., a Voice over LTE (VoLTE) network service, a Voice over IP (VoIP) network service, a video calling network service, etc.), or the like. In some implementations, S-CSCF 240 may request the monitoring information from one or more other network devices, such as MME 215, SGW 220, PGW 225, or the like. In some implementations, S-CSCF 240 may cause the one or more other network devices to collect the monitoring information, and may obtain the monitoring information from the one or more other network devices. S-CSCF 240 may provide the monitoring information to another device, such as mediation device 250, for the other device to store, process, and/or provide the monitoring information.

As further shown in FIG. 6, process 600 may include obtaining registration information indicating that the first user device identifier is not registered (block 615). For example, based on receiving the registration request, S-CSCF 240 may obtain registration information from another device, such as HSS 245. In some implementations, S-CSCF 240 may transmit a registration status request, that identifies the first user device identifier, to obtain the registration information. The registration information may identify a registration status of the first user device identifier. For example, the registration information may indicate that the first user device identifier is not registered with the IMS network. Based on the registration information, S-CSCF 240 may generate and/or provide an authentication challenge to user device 205, to prompt user device 205 (e.g., a user of user device 205) to provide one or more credentials, as described in more detail elsewhere herein. In some implementations, another device may obtain the registration information. For example, I-CSCF 235 may obtain the registration information from HSS 245, and may provide the registration information to S-CSCF 240.

As further shown in FIG. 6, process 600 may include providing an authentication challenge to a user device associated with the first user device identifier (block 620). For example, based on the registration information, S-CSCF 240 may determine that the first user device identifier is not registered with the IMS network. Based on determining that the first user device identifier is not registered, S-CSCF 240 may provide an authentication challenge to user device 205. The authentication challenge may cause user device 205, and/or a user of user device 205, to provide one or more credentials for authenticating the registration request.

In some implementations, S-CSCF 240 may provide the authentication challenge to user device 205 based on a network address included in the registration request. For example, the registration request may identify a network address of user device 205, to which S-CSCF 240 may provide the authentication challenge. In some implementations, S-CSCF 240 may provide the authentication challenge to user device 205 via one or more other devices. For example, S-CSCF 240 may provide the authentication challenge to I-CSCF 235, which may provide the authentication challenge to user device 205 via P-CSCF 230.

As further shown in FIG. 6, process 600 may include receiving a challenge response from the user device (block 625). For example, S-CSCF 240 may receive a challenge response from user device 205. The challenge response may include one or more credentials, which may be provided by user device 205 based on the authentication challenge. Based on the one or more credentials, S-CSCF 240 may authenticate the registration request and/or may register the first user device identifier, the second user device identifier, and/or user device 205 with the IMS network.

In some implementations, a device other than S-CSCF 240 may authenticate the registration request. For example, I-CSCF 235 may provide the registration request and/or the one or more credentials to HSS 245 for authentication, and I-CSCF 235 and/or HSS 245 may determine a result of the authentication. I-CSCF 235 may provide, to S-CSCF 240, the challenge response and/or an indication of the result of the authentication. Based on the result of the authentication, S-CSCF 240 may register the first user device identifier by providing, for example, a server assignment request to HSS 245 that indicates, to HSS 245, to register the first user device identifier.

As further shown in FIG. 6, process 600 may include registering the first user device identifier (block 630). For example, based on authenticating the registration request, S-CSCF 240 may register the first user device identifier with the IMS network, or may cause another device (e.g., HSS 245) to register the first user device identifier. In some implementations, S-CSCF 240 may provide a server assignment request to HSS 245 in order to register the first user device identifier. The server assignment request may cause HSS 245 to associate S-CSCF 240 with the subscriber profile, and may cause HSS 245 to provide the subscriber profile and/or subscriber information describing the subscriber profile to S-CSCF 240. The subscriber information may identify a subscriber name, user device 205, the first user device identifier, the second user device identifier, and/or other information related to the subscriber and/or user device 205.

In some implementations, the server assignment request may cause HSS 245 to register the first user device identifier and the second user device identifier with the IMS network. For example, HSS 245 may determine that the first user device identifier and the second user device identifier are associated with the subscriber profile, and may register the first user device identifier and the second user device identifier with the IMS network. In such cases, HSS 245 may provide, to S-CSCF 240, subscriber information that identifies the first user device identifier and the second user device identifier.

As further shown in FIG. 6, process 600 may include detecting a second user device identifier, identified by a subscriber profile, that is received based on registering the first user device identifier (block 635). For example, S-CSCF 240 may receive subscriber information based on registering the first user device identifier with the IMS core. The subscriber information may identify the second user device identifier that is associated with the subscriber profile. S-CSCF 240 may detect the second user device identifier. For example, S-CSCF 240 may be configured to detect user device identifiers, other than the user device identifier identified in the registration request, that are identified by the subscriber information.

As further shown in FIG. 6, process 600 may include determining that the second user device identifier is identified by the monitored identifier list (block 640). For example, S-CSCF 240 may detect the second user device identifier based on receiving the second user device identifier in association with the subscriber information. Based on detecting the second user device identifier, S-CSCF 240 may perform an action. For example, S-CSCF 240 may determine that the second user device identifier is identified by the monitored identifier list. In this way, S-CSCF 240 may detect the second user device identifier based on registering the first user device identifier with the network, which may enable S-CSCF 240 to monitor activity of the second user device identifier in a situation where the second user device identifier is identified by the monitored identifier list.

Based on determining that the second user device identifier is identified by the monitored identifier list, S-CSCF 240 may gather monitoring information based on activity related to user device 205 and/or activity related to the second user device identifier. For example, S-CSCF 240 may record information provided to and/or received from user device 205 by S-CSCF 240, may cause another device (E.g., MME 215, SGW 220, PGW 225, etc.) to collect monitoring information, may request monitoring information from another device, or the like. In some implementations, S-CSCF 240 may cause user device 205 to provide monitoring information related to the second user device identifier, such as call history, data usage, associated information, or the like.

As further shown in FIG. 6, process 600 may include collecting and/or providing monitoring information related to the second user device identifier and/or the user device (block 645). For example, S-CSCF 240 may collect monitoring and/or provide monitoring information to another device (e.g., mediation device 250). In some implementations, S-CSCF 240 may process the monitoring information before providing the monitoring information, by formatting the monitoring information, removing irrelevant monitoring information, or the like. Additionally, or alternatively, mediation device 250 may process, store and/or provide the monitoring information to another device (e.g., a device associated with a law enforcement agency, a network administrator, a government entity, etc.).

In some implementations, S-CSCF 240 may provide a notification to mediation device 250 based on determining that the second user device identifier is identified by the monitored identifier list. The notification may indicate subscriber information associated with the second user device identifier, may identify user device 205, may identify a time at which S-CSCF 240 processed the registration request, may identify a time at which S-CSCF 240 registered user device 205, may identify a time at which S-CSCF 240 ended a registration session with user device 205, and/or may include other information. In some implementations, S-CSCF 240 may provide the notification without providing monitoring information, which may conserve network bandwidth and/or processing power of S-CSCF 240.

The monitoring information may include information related to activity of user device 205 and/or the second user device identifier. For example, S-CSCF 240 may gather monitoring information identifying a location of user device 205, a quantity, originator, recipient, and/or duration of calls placed and/or received by user device 205, data usage associated with user device 205, one or more devices and/or resources accessed by user device 205, one or more other devices with which user device 205 communicates, information input to user device 205 by a user, or the like. In some cases, S-CSCF 240 may record the information based on communications with user device 205. Additionally, or alternatively, S-CSCF 240 may obtain the information from another device (e.g., base station 210, MME 215, SGW 220, PGW 225, etc.).

In some implementations, S-CSCF 240 may process the monitoring information. For example, S-CSCF 240 may format the monitoring information in a particular fashion, may eliminate information irrelevant to a monitoring activity, may eliminate information relating to user device identifiers other than a monitored user device identifier, or the like. In this way, S-CSCF 240 may conserve storage space, processing power, and/or network bandwidth by eliminating unnecessary and/or irrelevant monitoring information before providing the monitoring information.

In some implementations, S-CSCF 240 may provide the monitoring information as S-CSCF 240 obtains the information, which may conserve storage space of S-CSCF 240. Additionally, or alternatively, S-CSCF 240 may store the monitoring information, may process the monitoring information, and/or may provide the monitoring information. For example, S-CSCF 240 may provide monitoring information, gathered over a period of time, in a batch. In this way, S-CSCF 240 may reduce a quantity of messages transmitted via the LTE network, which may reduce network congestion.

As further shown in FIG. 6, process 600 may include providing an acknowledgement message to the user device (block 650). For example, S-CSCF 240 may provide an acknowledgement message to user device 205. In situations where S-CSCF 240 successfully registers user device 205 with the IMS network, the acknowledgement message may indicate that the first user device identifier and the second user device identifier are registered with the IMS network. In situations where S-CSCF 240 denies registration of user device 205, the acknowledgment message may indicate that the first user device identifier and/or the second user device identifier are not registered with the IMS network. S-CSCF 240 may provide the acknowledgment message to a network address, associated with user device 205, which may be received in association with the registration request and/or the challenge response.

In this way, S-CSCF 240 may determine a second user device identifier, associated with a subscriber profile, based on registering a first user device identifier and without transmitting additional requests or messages via the LTE network concerning the second user device identifier, which may conserve processor power of S-CSCF 240 and/or reduce bandwidth consumption and/or network congestion of the LTE network.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7G are diagrams of an example implementation 700 relating to example process 600 shown in FIG. 6. FIGS. 7A-7G show an example of detecting a second user device identifier based on registering a first user device identifier. For the purpose of FIGS. 7A-7G, assume that the operations described in FIG. 5 have been performed. In other words, assume that S-CSCF 240 stores a monitored identifier list identifying monitored user device identifiers of 555-176-2222, 123-456-7890, 234-567-8901, 345-678-9012, and 456-789-0123.

Figure 7A:
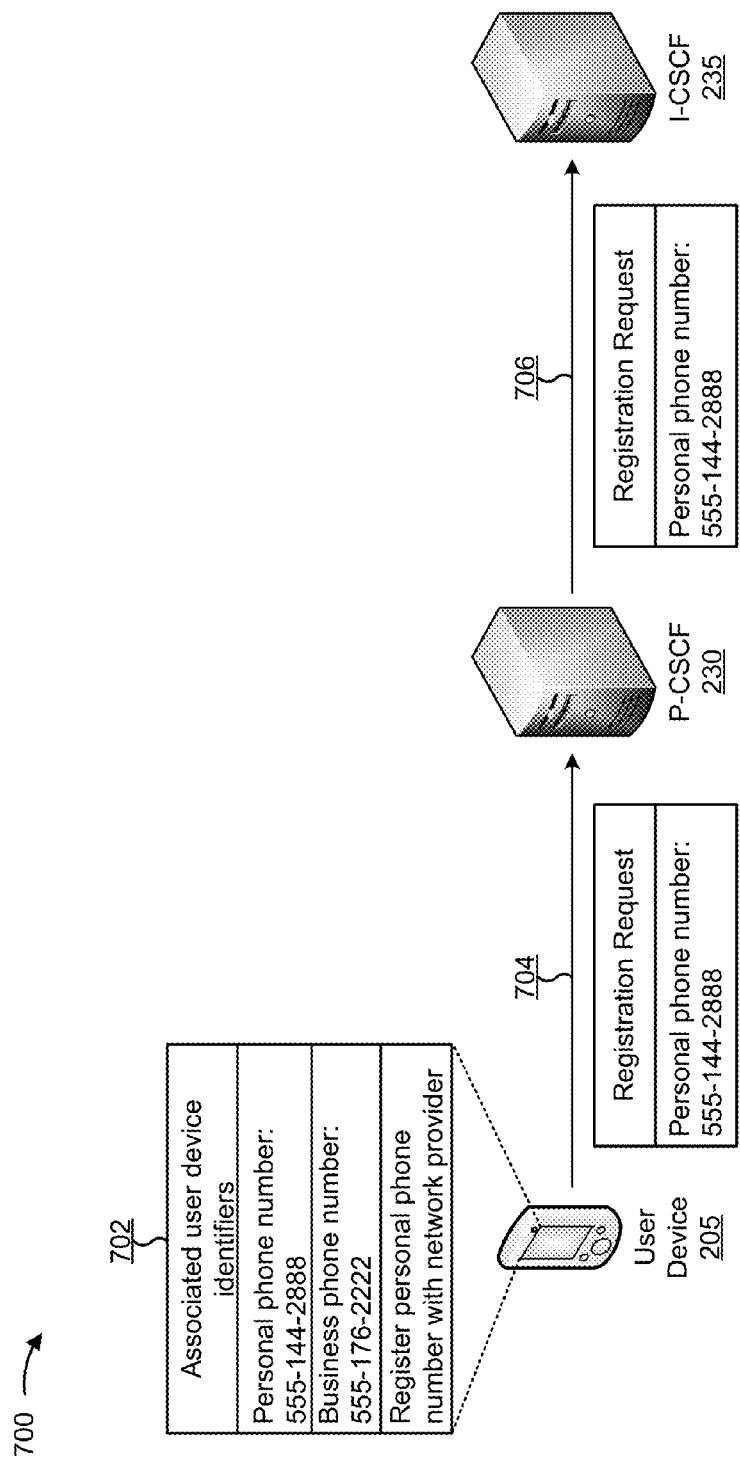
FIGS. 7A-7G are diagrams of an example implementation relating to the example process shown in FIG. 6.

As shown in FIG. 7A, and by reference number 702, user device 205 may be associated with two user device identifiers (e.g., a personal phone number of 555-144-2888 and a business phone number of 555-176-2222). Note that the business phone number is identified by the monitored identifier list, and that the personal phone number is not identified by the monitored identifier list. As further shown, user device 205 may determine to register the personal phone number with the IMS network. As shown by reference number 704, user device 205 may provide, to P-CSCF 230, a registration request. As further shown, the registration request may identify the personal phone number associated with user device 205. As shown by reference number 706, P-CSCF 230 may provide the registration request to I-CSCF 235.

Figure 7B:
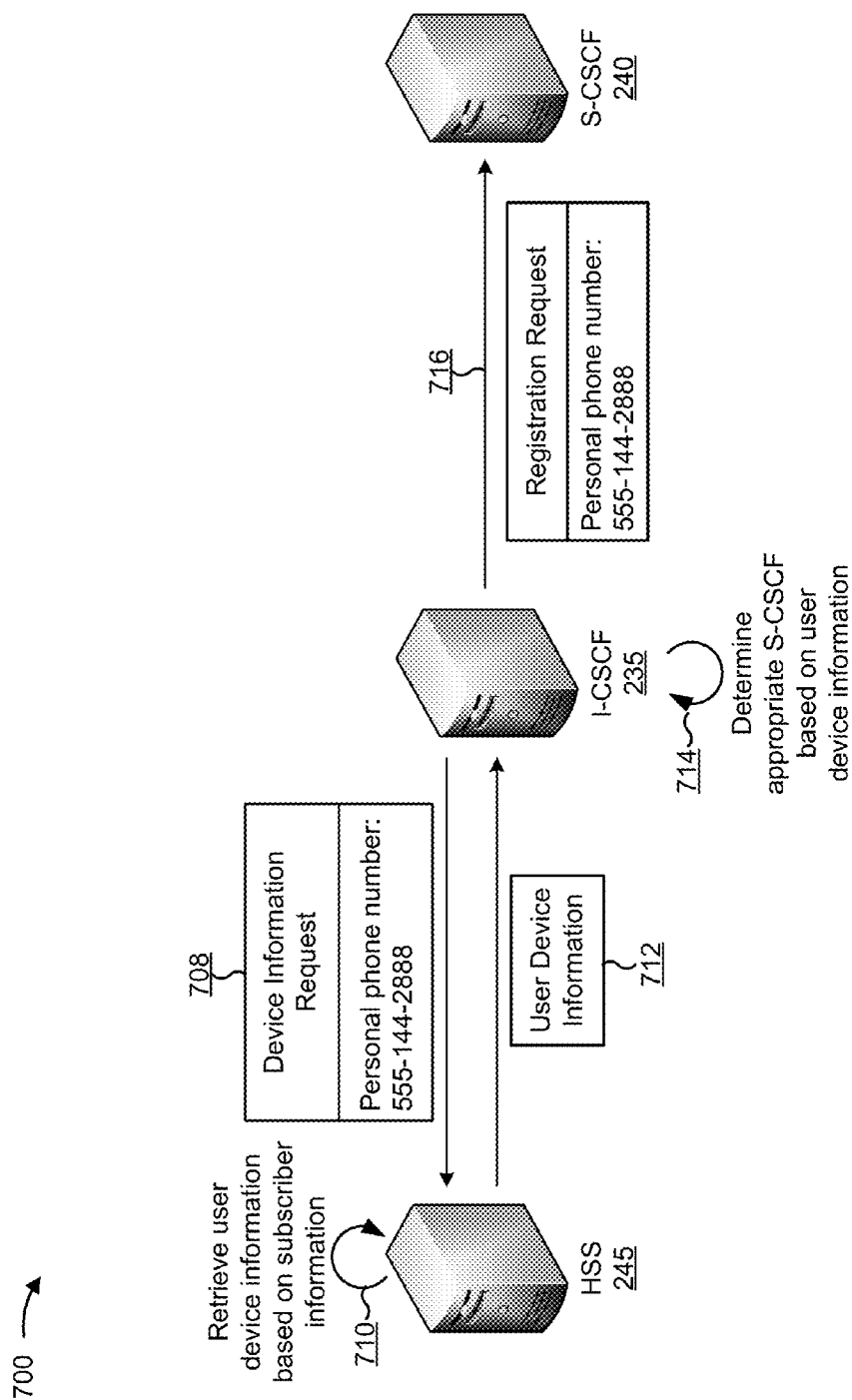

As shown in FIG. 7B, and by reference number 708, I-CSCF 235 may provide, to HSS 245, a device information request that identifies the user device identifier of the personal phone number. As shown by reference number 710, HSS 245 may retrieve user device information that describes user device 205. As shown by reference number 712, HSS 245 may provide the user device information to I-CSCF 235. As shown by reference number 714, based on the user device information, I-CSCF 235 may determine an appropriate S-CSCF 240 to register user device 205. As shown by reference number 716, I-CSCF 235 may provide the registration request to the appropriate S-CSCF 240.

Figure 7C:
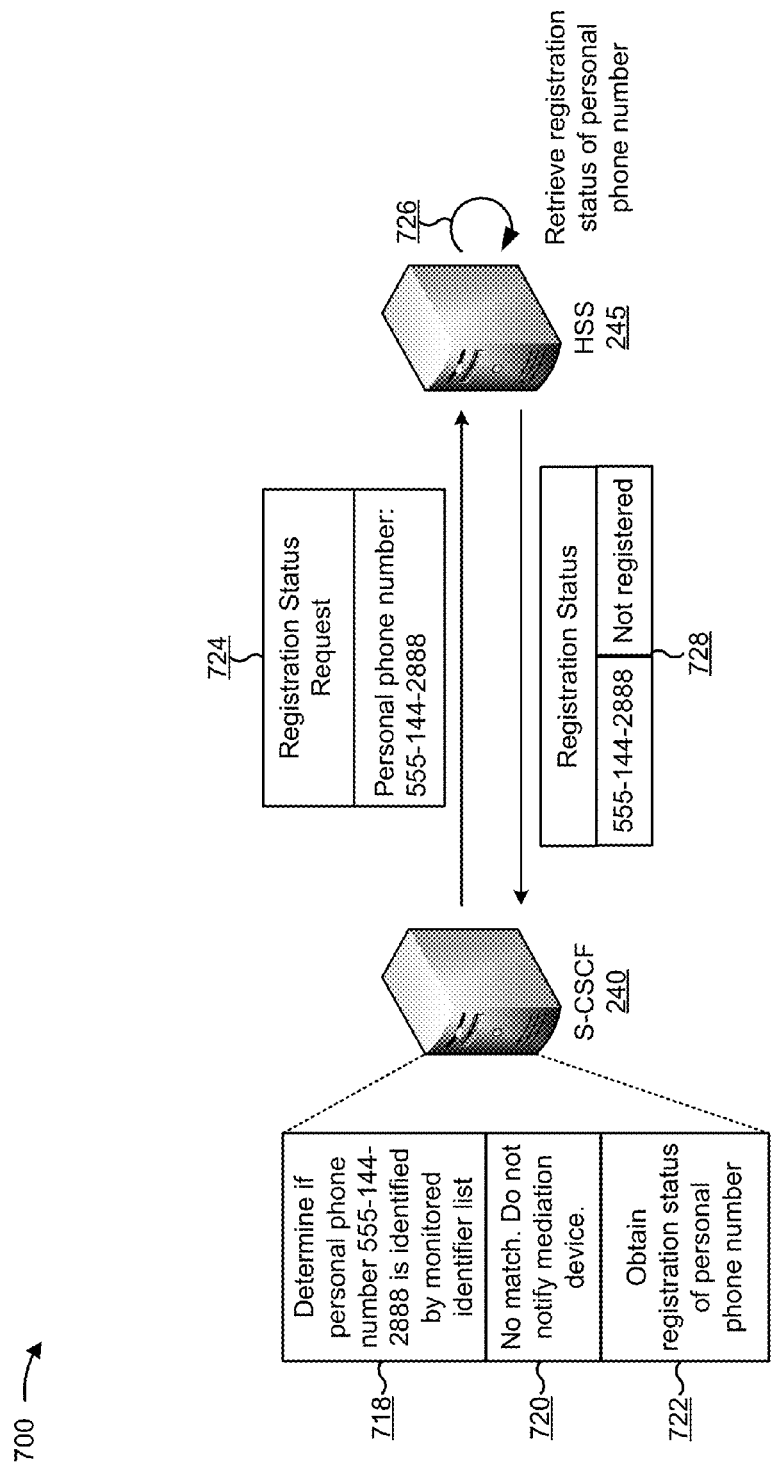

As shown in FIG. 7C, and by reference number 718, S-CSCF 240 may determine whether the personal phone number is identified by a monitored identifier list. As shown by reference number 720, S-CSCF 240 determines that the personal phone number is not identified by the monitored identifier list. As shown by reference number 722, S-CSCF 240 may determine to obtain a registration status, associated with the personal phone number of 555-144-2888, from HSS 245. As shown by reference number 724, S-CSCF 240 obtains the registration status by providing a registration status request, identifying the personal phone number, to HSS 245. As shown by reference number 726, HSS 245 may retrieve information identifying the registration status of the personal phone number, and may provide the information identifying the registration status to S-CSCF 240, as shown by reference number 728. As shown, the registration information may indicate that the personal phone number is not registered with the IMS network.

Figure 7D:
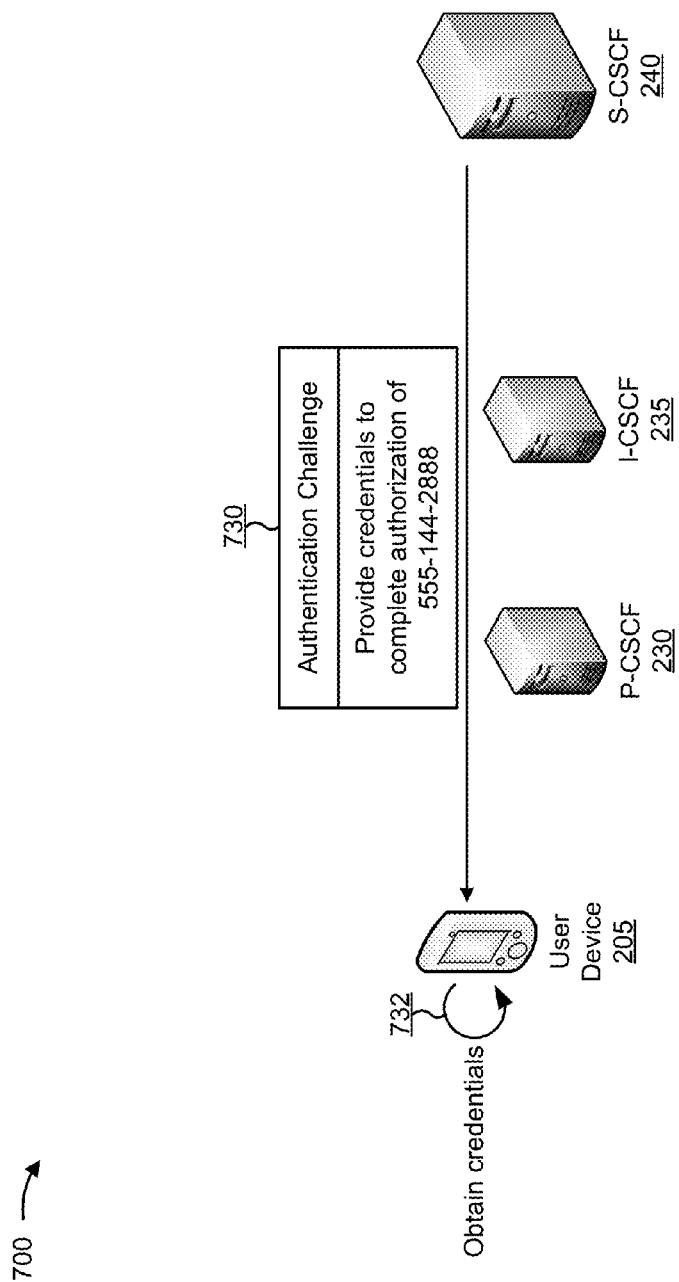

As shown in FIG. 7D, and by reference number 730, S-CSCF 240 may provide, to user device 205 and via P-CSCF 230 and I-CSCF 235, an authentication challenge. Assume that S-CSCF 240 provides the authentication challenge based on the personal phone number of 555-144-2888 not being registered with the IMS network. As shown, the authentication challenge may request that user device 205 provide one or more credentials to complete registration of the personal phone number. As shown by reference number 732, user device 205 may obtain the one or more credentials based on the authentication challenge.

Figure 7E:
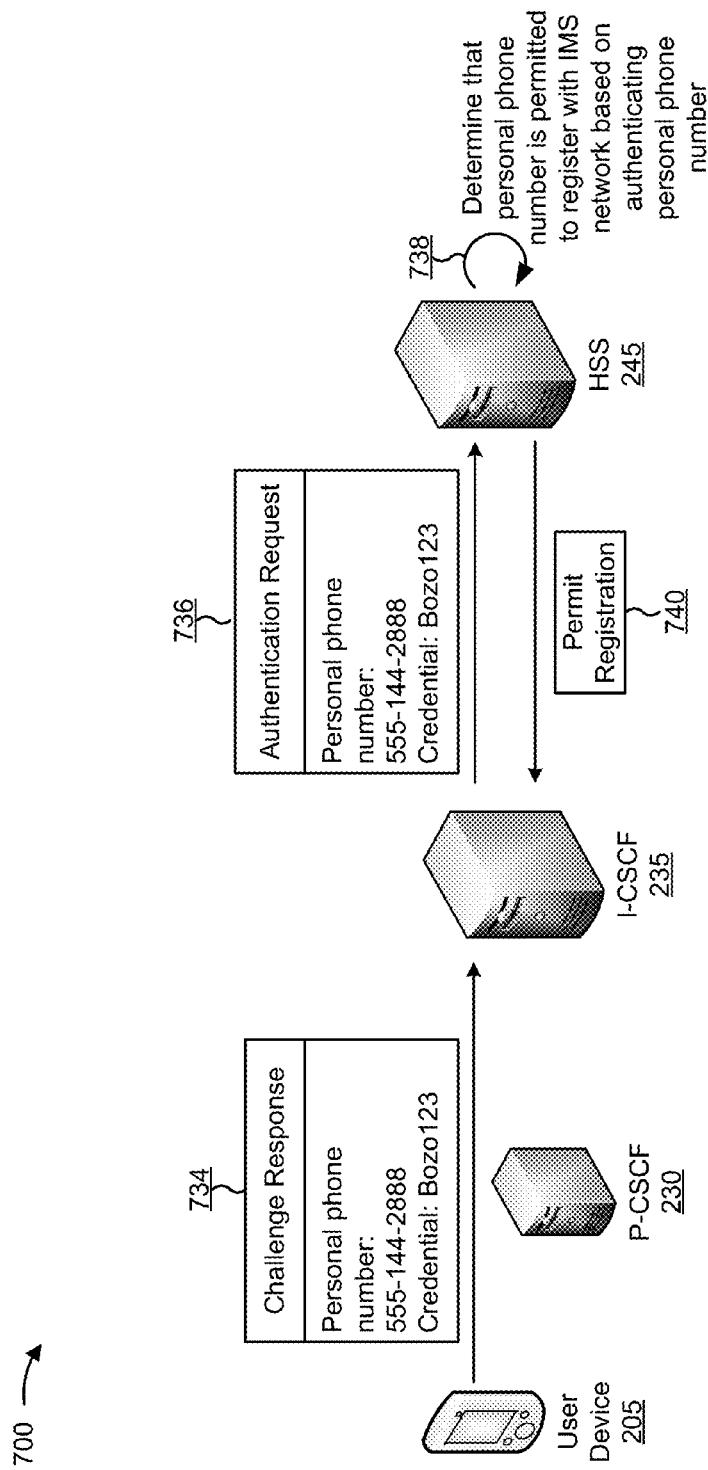

As shown in FIG. 7E, and by reference number 734, user device 205 may provide the one or more credentials (e.g., a password of "Bozo123") to I-CSCF 235, via P-CSCF 230 and in a challenge response. As shown by reference number 736, I-CSCF 235 may provide an authentication request, including the challenge response, to HSS 245. As shown by reference number 738, HSS 245 may determine, based on a subscriber profile associated with the personal phone number, that the personal phone number is permitted to register with the IMS network. As further shown, HSS 245 may determine that the personal phone number is permitted to register with the IMS network based on authenticating the personal phone number and the password. As shown by reference number 740, HSS 245 may provide an indication, to I-CSCF 235, that the personal phone number is permitted to register with the IMS network (e.g., a "permit registration" message).

Figure 7F:
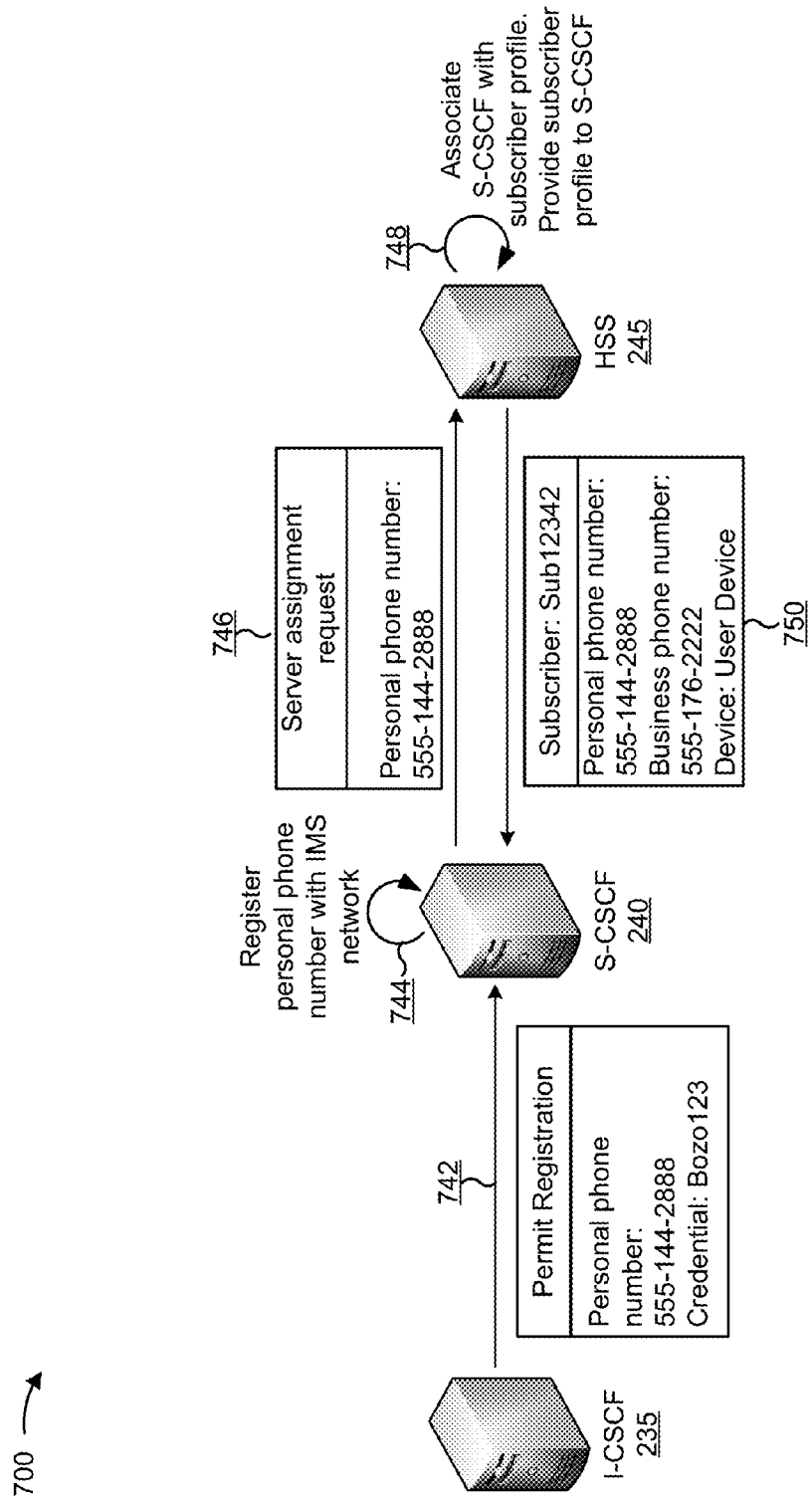

As shown in FIG. 7F, and by reference number 742, I-CSCF 235 may provide, to S-CSCF 240, an indication to register the personal phone number with the IMS network. As shown by reference number 744, based on the indication to register the personal phone number, S-CSCF 240 may determine to register the personal phone number with the IMS network. As shown by reference number 746, S-CSCF may provide a server assignment request to HSS 245 to register the personal phone number. As shown, the server assignment request may identify the personal phone number. As shown by reference number 748, HSS 245 may associate S-CSCF 240 with a subscriber profile associated with the personal phone number of 555-144-2888 and the business phone number of 555-176-2222, and may provide the subscriber profile to S-CSCF 240. Assume that HSS 245 registers the personal phone number and the business phone number based on the personal phone number and the business phone number being associated with the subscriber profile. As shown, the subscriber profile may identify a subscriber (e.g., Sub12342), the user device identifiers associated with the subscriber profile (e.g., the personal phone number of 555-144-2888 and the business phone number of 555-176-2222), and user device 205.

Figure 7G:
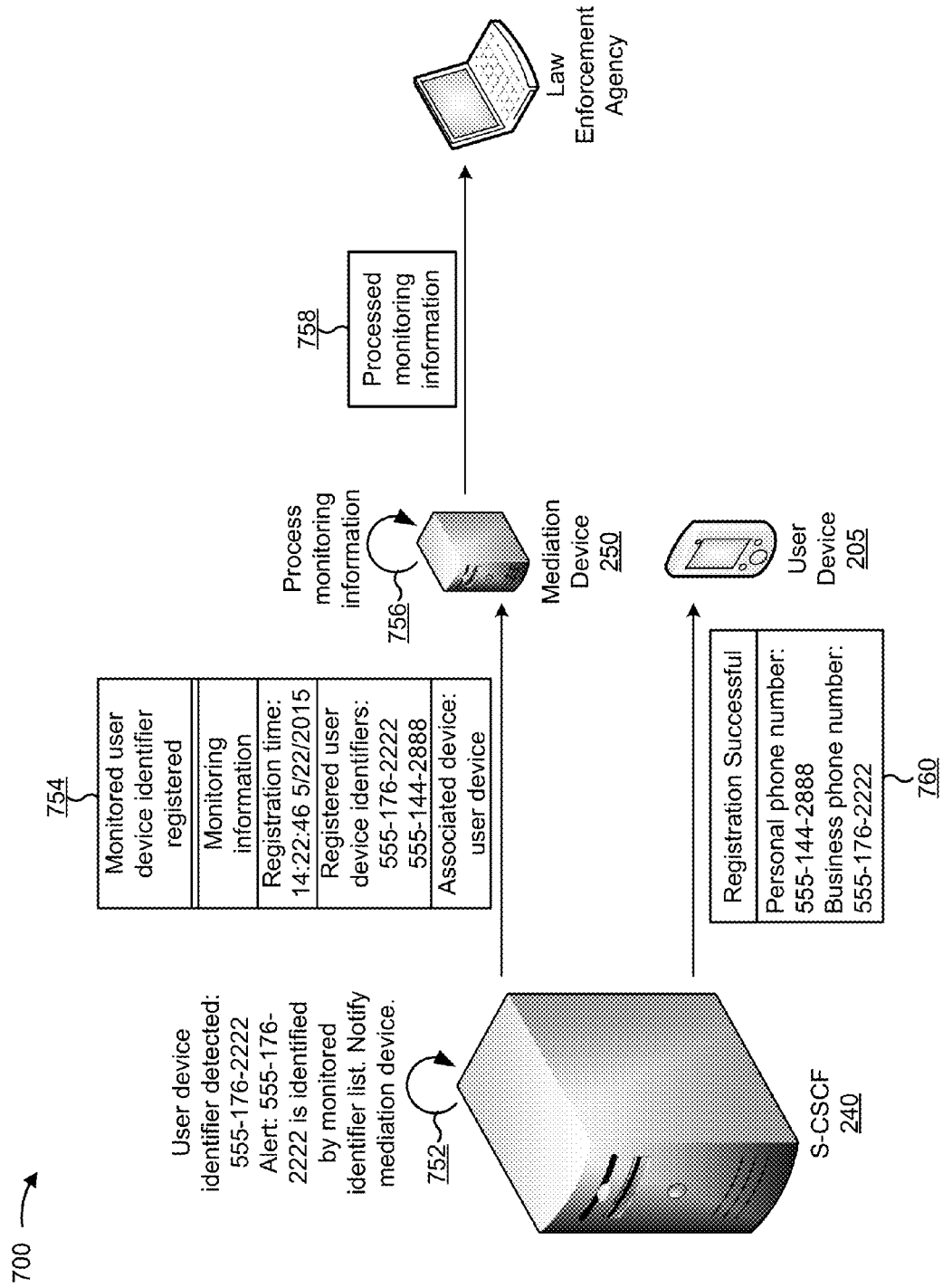

As shown in FIG. 7G, and by reference number 752, S-CSCF 240 may detect the business phone number of 555-176-2222 in the subscriber profile. As further shown, S-CSCF 240 may determine that the business phone number is identified by the monitored identifier list, and may determine to notify mediation device 250 that the business phone number has been registered to the IMS network. As shown by reference number 754, S-CSCF 240 may notify mediation device 250, and may provide monitoring information, related to the monitored business phone number, to mediation device 250. Here, the monitoring information identifies a registration time (e.g., 14:22:46 5/22/2015), a list of registered user device identifiers (e.g., the business phone number of 555-176-2222 and the personal phone number of 555-144-2888) and a user device associated with the user device identifiers (e.g., user device 205).

As shown by reference number 756, mediation device 250 may process the monitoring information (e.g., to format the monitoring information, to remove irrelevant monitoring information, etc.). As shown by reference number 758, mediation device 250 may provide processed monitoring information to a device associated with a law enforcement agency. As shown by reference number 760, S-CSCF 240 may provide, to user device 205, a message indicating successful registration of the personal phone number and the business phone number with the IMS network.

As indicated above, FIGS. 7A-7G are provided merely as an example. Other examples are possible and may differ from what was described with regard to FIGS. 7A-7G.

In this way, S-CSCF 240 may determine a second user device identifier, associated with a subscriber profile, based on a registration request from a first user device identifier and using messages and/or information transmitted in the process of registering the first user device identifier, which may conserve processor power of S-CSCF 240 and/or reduce bandwidth consumption and/or network congestion of the network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive a registration request, associated with a first user device identifier, from a user device,
      the first user device identifier being associated with a subscriber profile,
      the subscriber profile identifying the first user device identifier and a second user device identifier associated with the user device;
   determine that the first user device identifier is not registered with a network;
   provide an authentication challenge to the user device based on determining that the first user device identifier is not registered;
   receive, based on providing the authentication challenge, a challenge response that includes one or more credentials,
      the one or more credentials being based on information provided by a user to the user device;
   authenticate the registration request based on the one or more credentials;
   register, based on authenticating the registration request, the first user device identifier based on the challenge response;
   receive subscriber information, associated with the first user device identifier, based on registering the first user device identifier;
   determine that the subscriber information identifies the second user device identifier,
      the second user device identifier being associated with the subscriber profile;
   determine whether the second user device identifier is identified on a list; and
   perform an action based on whether the second user device identifier is identified on the list,
      the action including selectively providing a notification to a mediation device based on whether the list identifies the second user device identifier,
      the device providing the notification when the list identifies the second user device identifier, and
      the device not providing the notification when the list does not identify the second user device identifier.

2. The device of claim 1, where the one or more processors, when performing the action, are to:
   cause monitoring information, related to the second user device identifier, to be collected based on the second user device identifier being identified on the list; and
   provide the monitoring information to another device.

3. The device of claim 2, where the monitoring information includes at least one of:
   information related to data usage associated with the second user device identifier,
   information related to voice calls associated with the second user device identifier,
   information related to network service usage associated with the second user device identifier,
   information identifying a location associated with the user device or the second user device identifier, information related to webpages accessed via the user device, or information input to the user device.

4. The device of claim 1, where the one or more processors, when registering the first user device identifier, are to:
provide a request based on authenticating the registration request,
the request causing a home subscriber server to register the first user device identifier and the second user device identifier; and
where the one or more processors, when receiving the subscriber information, are to:
receive the subscriber information based on the request.

5. The device of claim 1, where the one or more processors, when registering the first user device identifier, are to:
selectively register, or deny registration of, the first user device identifier and the second user device identifier based on authenticating the registration request,
the device registering the first user device identifier and the second user device identifier when the authentication is successful, and
the device denying registration of the first user device identifier and the second user device identifier when the authentication is unsuccessful.

6. The device of claim 1, where the one or more processors are further to:
provide, to the user device, an acknowledgment message indicating a registration status of the first user device identifier.

7. The device of claim 1, where the first user device identifier and the second user device identifier include at least one of:
an IP multimedia public identity,
a uniform resource identifier,
a mobile device identifier, or
an email address.

8. A non-transitory computer-readable medium storing instructions, the instructions comprising:
one or more instructions that, when executed by one or more processors of a device, cause the one or more processors to:
receive a registration request from a user device,
the registration request being associated with a first user device identifier,
the first user device identifier being associated with a subscriber profile,
the subscriber profile identifying the first user device identifier and a second user device identifier associated with the user device;
determine that the first user device identifier is not registered with a network;
transmit an authentication challenge, based on the registration request, based on determining that the first user device identifier is not registered;
receive, based on transmitting the authentication challenge, a challenge response that includes one or more credentials;
the one or more credentials being based on information provided by a user to the user device;
authenticate the registration request based on the one or more credentials;
register, based on authenticating the registration request, the first user device identifier based on the challenge response;
receive subscriber information, associated with the first user device identifier, based on registering the first user device identifier;

determine that the subscriber information identifies the second user device identifier,
the second user device identifier being associated with the subscriber profile;
determine whether the second user device identifier is identified on a list;
cause activity concerning the second user device identifier to be monitored; and
selectively provide a notification to a mediation device based on whether the list identifies the second user device identifier,
the device providing the notification when the list identifies the second user device identifier, and
the device not providing the notification when the list does not identify the second user device identifier.

9. The non-transitory computer-readable medium of claim 8, where the one or more instructions, when executed by the one or more processors, further cause the one or more processors to:
obtain the list from the mediation device,
the list identifying a plurality of user device identifiers that are subject to monitoring.

10. The non-transitory computer-readable medium of claim 8, where the one or more instructions, that cause the one or more processors to cause the activity to be monitored, cause the one or more processors to:
obtain, from one or more devices in the network, monitoring information describing activity associated with the second user device identifier or the user device associated with the second user device identifier; and
provide the monitoring information.

11. The non-transitory computer-readable medium of claim 10, where the monitoring information includes at least one of:
information related to data usage associated with the second user device identifier,
information related to voice calls associated with the second user device identifier,
information related to network service usage associated with the second user device identifier,
information identifying a location associated with the user device or the second user device identifier,
information related to webpages accessed via the user device, or
information input to the user device.

12. The non-transitory computer-readable medium of claim 8, where the one or more instructions, that cause the one or more processors to cause the activity to be monitored, cause the one or more processors to:
determine monitoring information that describes activity related to the first user device identifier or the second user device identifier;
process the monitoring information; and
provide the monitoring information.

13. The non-transitory computer-readable medium of claim 8, where the one or more instructions, that cause the one or more processors to register the first user device identifier, cause the one or more processors to:
provide a request that identifies the first user device identifier to a home subscriber server,
the request causing the home subscriber server to register the first user device identifier and the second user device identifier; and
where the one or more instructions, that cause the one or more processors to receive the subscriber information, cause the one or more processors to:

receive the subscriber information based on providing the request.

14. The non-transitory computer-readable medium of claim 8, where the one or more instructions, when executed by the one or more processors, cause the one or more processors to:
provide a message indicating that the first user device identifier and the second user device identifier are registered.

15. A method, comprising:
receiving, by a device, a registration request from a user device that identifies a first user device identifier;
determining, by the device, that the first user device identifier is not registered with a network;
transmitting, by the device, an authentication challenge based on determining that the first user device identifier is not registered,
the authentication challenge requesting one or more credentials associated with a subscriber profile,
the first user device identifier being associated with the subscriber profile,
the subscriber profile identifying the first user device identifier and a second user device identifier associated with the user device;
receiving, by the device and based on transmitting the authentication challenge, a challenge response that includes the one or more credentials associated with the subscriber profile;
the one or more credentials being based on information provided by a user to the user device;
authenticate, by the device, the registration request based on the one or more credentials;
causing, by the device and based on authenticating the registration request, the first user device identifier to be registered based on the challenge response;
receiving, by the device, subscriber information that is associated with the first user device identifier,
the subscriber information being received based on causing the first user device identifier to be registered;
determining, by the device, that the subscriber information identifies the second user device identifier,
the second user device identifier being associated with the subscriber profile; and
determining, by the device, whether the second user device identifier is identified on a list; and
selectively providing a notification to a mediation device based on whether the list identifies the second user device identifier,
the device providing the notification when the list identifies the second user device identifier, and
the device not providing the notification when the list does not identify the second user device identifier.

16. The method of claim 15, further comprising:
obtaining the list from the mediation device,
the list identifying a plurality of user device identifiers that are subject to monitoring.

17. The method of claim 15, further comprising:
gathering monitoring information related to the second user device identifier or the user device associated with the second user device identifier; and
providing the monitoring information.

18. The method of claim 17, where the monitoring information includes at least one of:
information related to data usage associated with the second user device identifier,
information related to voice calls associated with the second user device identifier,
information related to network service usage associated with the second user device identifier,
information identifying a location associated with the user device or the second user device identifier,
information related to webpages accessed via the user device, or
information input to the user device.

19. The method of claim 15, further comprising:
obtaining, from another device of the network, monitoring information;
processing the monitoring information; and
providing the monitoring information.

20. The method of claim 15, where causing the first user device identifier to be registered comprises:
providing a request that identifies the first user device identifier to another device,
the request causing the other device to register the first user device identifier and the second user device identifier; and
where receiving the subscriber information comprises:
receiving the subscriber information based on providing the request.

* * * * *